United States Patent [19]

Mahoney et al.

[11] Patent Number: 4,835,383

[45] Date of Patent: May 30, 1989

[54] HIGH MASS ION DETECTION SYSTEM AND METHOD

[75] Inventors: John F. Mahoney, South Pasadena; Julius Perel, Altadena, both of Calif.

[73] Assignee: Phrasor Scientific, Inc., Duarte, Calif.

[21] Appl. No.: 82,785

[22] Filed: Aug. 6, 1987

[51] Int. Cl.[4] .............................................. B01D 59/44
[52] U.S. Cl. ................................... 250/281; 250/282; 250/283
[58] Field of Search ............ 250/281, 282, 283, 423 R

[56] References Cited

U.S. PATENT DOCUMENTS

| | | | |
|---|---|---|---|
| 3,898,456 | 8/1975 | Dietz | 250/299 |
| 3,973,121 | 8/1976 | Fite et al. | 250/281 |
| 3,986,024 | 10/1976 | Radermacher | 250/283 |
| 4,151,414 | 4/1979 | Fite et al. | 250/282 |
| 4,267,448 | 5/1981 | Feser et al. | 250/281 |
| 4,423,324 | 12/1983 | Stafford | 250/281 |

OTHER PUBLICATIONS

Handbook of Chemistry and Physics, Robert C. Weast, Ph.D., The Chemical Rubber Co., 1972-1973, 53rd edition.

Kawano, "Theoretical Study of the Long-Pending Problem of How to Select the Best Condition for Operating a Surface-Ionization-Type Negative-Ion Source to Detect Gaseous Sample Molecules", International Journal of Mass Spectrometry and Ion Processes, 69 (1986), pp. 97-108.

Mabud, et al., "Surface-Induced Dissociation of Molecular Ions", International Journal of Mass Spectrometry and Ion Processes, 67 (1985), pp. 285-294.

Granneman, et al., "H− and Li− Formation by Scattering H+, H$_2$+ and Li+ from Cesiated Tungsten Surfaces", FOM-Institute for Atomic and Molecular Physics, Kruislaan 407, 1098 SJ Amsterdam, (1984), pp. 206-217.

Huffman, et al., "Low Work Function Surface for Improving the Yield of Negative Hydrogen Ions", Proc. 2nd Symp. on the. Production and Neutralization of Negative Hydrogen Ions and Beams, BNL 51304, (1980), pp. 119-124.

Beuhler, et al., "Threshold Studies of Secondary Electron Emission Induced by Macro-Ion Impact on Solid Surfaces", Nucl. Instrum. Meth., 170 (1980), pp. 309-315.

JEOL Ltd., "Evaluation of Post Acceleration Type High Sensitive Ion Detector for Mass Spectrometer", JEOL News, 21A (No. 2), (1985), pp. 10-13.

Kurz, "Channel Electron Multipliers", American Laboratory (Mar. 1979).

Daly, "Scintillation Type Mass Spectrometer Ion Detector", Rev. Sci. Instrum. 31 (1960), pp. 264-267.

Katakuse et al., "Post Acceleration for Heavy Molecule Ion Detector". Mass Spectrometry, 33, (1985), pp. 145-147.

Primary Examiner—Bruce C. Anderson
Attorney, Agent, or Firm—Spensley Horn Jubas & Lubitz

[57] ABSTRACT

An improved ion detection system and method for detection of low or high mass ions having high electron affinity constituent atoms or molecules. A target with a low work function target surface is employed to fragment the incident ions and produce secondary negative ions and electrons. A cesium or barium oxide source is employed to optimally provide a monolayer of cesium or barium oxide on the target surface of a molybdenum or tungsten target. The secondary ions and electrons are detected by a conventional electron multiplier detector. The potential difference between the target surface and electron multiplier detector is chosen to accelerate the secondary ions and electrons to the electron multiplier detector with an energy corresponding to high detection efficiency.

20 Claims, 3 Drawing Sheets

HIGH MASS ION DETECTION SYSTEM AND METHOD

BACKGROUND OF THE INVENTION

1. Field of the Invention

The present invention relates to mass spectrometry. In particular, the present invention relates to ion detection systems for mass spectrometry of biomolecules and other high molecular weight substances. Additionally, the present invention relates to improved ion detection for low molecular weight substances.

2. Background of Related Art

Accurate mass analysis of substances covering a wide range of molecular mass values is of increasing importance. In particular, accurate determination of molecular weights of proteins, and other biomolecules, is of paramount importance in biochemistry and modern biology. The molecular weight of a protein indicates its size, the possible presence of subunits (polymeric and monomeric molecular weights), and gives a rough idea of the number of component amino acids. An accurate method of high mass molecular weight determinations for proteins would be of special importance to the biotechnology field, since even rare proteins are now available by recombinant DNA techniques, and the first criteria of identity from batch to batch is the molecular weight of the protein.

In general, proteins range in molecular weight from 10,000 to 500,000 amu, but this range can be extended to include peptides (below 10,000 amu), or certain multimeric proteins (over 500,000 amu). At present, however, no accurate and efficient means is available for determination of biomolecular mass for the higher portion of the protein mass range, and in particular, for masses from 10,000 to 500,000 amu.

Determination of protein molecular weights by current methodologies, such as sedimentation, molecular sieving, gel electrophoresis, etc., present various special problems. The method of choice for determining protein molecular weights (weight average) has been sedimentation techniques in the ultracentrifuge. However, these techniques are technically cumbersome, slow and require the determination of other physical properties such as the partial specific volume of the protein. The accuracy of these methods can sometimes be as precise as to within 1000 mass units for a molecular weight of 10,000 amu, but more often are subject to much greater errors.

Mass spectrometry is one potential method for providing accurate determination of molecular weight of biomolecules and other molecules spanning a broad mass range. Mass spectrometry employs three functional aspects: sample ionization, mass analysis and ion detection. Progress has been achieved in all three major areas of mass spectral analysis. As a result reasonably effective measurements of certain biomolecules of mass below 10,000 amu have been achieved. Mass measurements for proteins as large as 25,000 amu have also been made using plasma desorption mass spectrometry. Nevertheless, the majority of protein structures have molecular weights from 10,000 to 200,000 amu and the need thus exists for new and improved methods in mass spectrometry to extend the range of mass analysis.

Presently available ion detection systems are not capable of efficient detection of ions in the mass range of from 10,000 to 500,000 amu, and in particular in the range of from 25,000 to 500,000 amu. Conventional means for detecting ions employed in mass spectrometry employ the impact of the ions at high velocity on a surface with the subsequent ejection of secondary electrons. These secondary electrons are detected by an electron multiplier resulting in an amplified signal pulse. Perhaps the most widely adopted method for the detection of low mass ions in mass spectrometry is the Channeltron Electron Multiplier (CEM), illustrated schematically in FIG. 1. This uses the direct impingement of incident ions on the surface of the detector to produce secondary electrons. Problems for the detection of high molecular weight ions derive from the well-known measured characteristics of these devices; in particular the reduction in the gain of CEM's with increasing M/Z of the bombarding ion. Now widely accepted, the phenomenon is attributed to the low yield of secondary electrons ejected by slow-moving, high mass molecules. R. J. Beuhler and L. Friedman, *Threshold Studies of Secondary Electron Emission induced by Macro-Ion Impact on Solid Surfaces*, Nucl. Instrum. Meth., 170, 309 (1980). Below a certain threshold velocity, detection may not be possible at all.

In an attempt to avoid the limitations on the primary ion source accelerating voltage, post-acceleration of the ions was introduced to increase the velocity of high mass ions. One approach to providing post-acceleration of high mass ions employs application of high voltages across the electron multipliers to accelerate the ions above the threshold. This is impractical, however, for voltages in excess of 3 to 4 kV due to intolerably low signal-to-noise levels. The disadvantages of such systems also include size, cost and complexity associated with bringing detector signals at high voltage to ground potential.

Another approach to post-acceleration ion detection for mass spectrometry is illustrated in FIG. 2. Post-acceleration of incident ion beams is provided by an intermediate conversion electrode (dynode) which can operate at high voltages. This circumvents one of the major problems associated with floating detectors at high voltages; for example, coupling the detector output signal to ground level electronics. Instead of directly bombarding the detector surface, the primary ions impact the dynode surface with an energy given by the voltage (V):

$$V = V_a + V_d$$

where $V_a$ is the ion source accelerating voltage and $V_d$ is the voltage applied to the dynode. Secondary electrons ejected from the dynode surface are subsequently detected by conventional multipliers. Detection of high mass ions (50,000–100,000 amu) by post-acceleration methods still require dynode voltages of the same magnitude.

Various post-acceleration detector configurations have been reported and are commercially available from some manufacturers of magnetic instruments. One such detector is manufactured by JEOL Ltd. and is described in *Evaluation of Post Acceleration Type High Sensitive Ion Detector For Mass Spectrometer*, JEOL News, 21A (No. 2), 34 (1985).

One disadvantage of post-acceleration detectors, related to the energy of the electrons impinging on the final detector surface, represents a form of "Catch-22" for detector efficiency. High dynode voltages are required to accelerate high mass ions to an energy sufficient to produce secondary electrons, however, for high dynode voltages, the secondary electrons impinge on the multiplier with energies higher than the energy for maximum detection efficiency. This is illustrated by FIG. 3 which shows the CEM response as a function of the incident electron energy. (Taken from E. Kurz, *Channel Electron Multipliers*, American Laboratory (March 1979).) Inspection of FIG. 3 shows that for electrons of energy E=40 KeV, the detection efficiency has dropped to approximately 60% from a peak of 90% at E=500 eV. Therefore, the gain in secondary emission at the conversion dynode is offset in part by the decrease in detector efficiency at the higher incident electron energies.

Another disadvantage of post acceleration, and other detectors, is that to detect negative sample ions, existing detectors must rely on the ejection of lower yield, secondary positive ions. Consequently, the detection of high mass, negative ions is usually less sensitive than the detection of positively charged high mass ions. One approach to a post acceleration positive ion detector is shown in U.S. Pat. No. 4,423,324 to Stafford.

Various other approaches have been attempted to resolve one or more of these problems. E.g., N. R. Daly, *Scintillation Type Mass Spectrometer Ion Detector*, Rev. Sci. Instrum., 31, 264 (1960); I. Katakuse, H. Nakabushi, T. Ichihara, Y. Fujita, T. Matsuo, T. Sukurai and H. Matsuda, *Post Acceleration For Heavy Molecule Ion Detector*, Mass Spectrometry, 33, 145 (April, 1985). The usefulness of such approaches for yielding effective high mass resolution has not been demonstrated, however.

Thus at present high mass ion detection in mass spectrometry instruments remains limited by ion acceleration voltages at the source.

SUMMARY OF THE INVENTION

The present invention provides an ion detection system and method with greatly improved sensitivity in detection of high mass ions.

The present invention further provides an ion detection system and method capable of detecting high mass ions without requiring high ion source acceleration voltages.

The present invention further provides an ion detection system and method capable of detection of high mass ions without employing high post-acceleration voltages.

The present invention further provides an ion detection system and method with improved sensitivity for detection of low mass ions.

The present invention further provides an ion detection system and method equally effective for detecting positive or negative incident ions.

The present invention further provides an ion detection system having improved wear characteristics.

The present invention provides an ion detection system and method based on the measurement of secondary negative ions and electrons produced by the impact of incident ions having high electron affinity constituents on a cesiated, or similarly low work function, target surface. In a preferred embodiment the ion detection system of the present invention is employed in conjunction with a source of biomolecular ions, which ions are typified by high electron affinity constituents, and in particular, carbon, hydrogen and oxygen constituent atoms. The biomolecular ion beam is collimated by a shield and accelerated to a target by a predetermined bias potential applied to the target, which is chosen to be negative or positive depending upon the polarity of the incident ions. The target includes a target surface coated with a monolayer of a low work function material such as cesium or barium oxide. The monolayer of cesium, or other low work function material, may be provided by the utilization of a reservoir of such material adjacent the target surface which is periodically heated to vaporize the material to allow a monolayer to form on the target surface. A heater is also employed to heat the target to a temperature which enhances emission of electrons upon impact of the incident ions. The heated, low work function, target surface, in conjunction with the high electron affinity of the fragments produced by impacting the primary, incident biomolecules results in high yields of secondary negative ions and electrons. The negative ions are comprised primarily of relatively small molecules comprised of carbon, hydrogen and/or oxygen constituents.

A conventional electron multiplier detector may be employed to detect the secondary ions and electrons. The secondary ion fragments are accelerated from the target to the electron multiplier detector by the difference in bias potential of the target and electron multiplier detector. Due to the relatively low mass of the secondary fragment ions and electrons, these secondary negatively charged particles are accelerated to a velocity sufficient to create a strong signal on the electron multiplier detector.

DESCRIPTION OF THE PREFERRED EMBODIMENT

Figure 4:
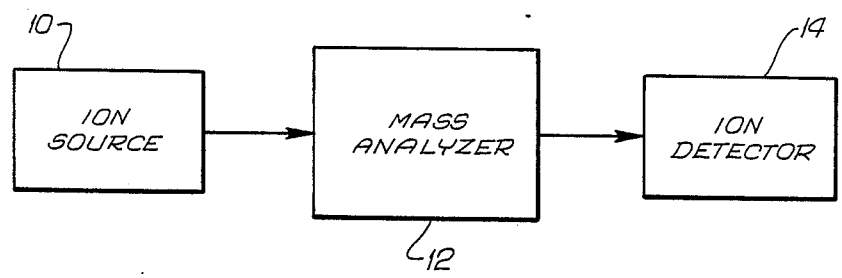
FIG. 4 is a schematic drawing of a mass spectrometer incorporating the present invention.

FIG. 4 illustrates schematically the structural features of a mass spectrometer employing the high mass ion detection system of the present invention. A beam of ions (positive or negative) is provided by an ion source 10. As discussed in more detail below, optimum efficiency of the ion detection system requires that the ion beam be composed of ions which dissociate on impact to provide fragments with high electron affinities. Biomolecules possess such high electron affinity constituent atoms and molecules, therefore in one preferred application a beam of biomolecular ions is provided by ion source 10. Several types of ion sources suitable for providing a beam of biomolecular ions are described in A. Benninghoven, ed., *Ion Formation From Organic Solids*, Springer-Verlag (1983), pp. 32 and 90. Due to the increased sensitivity of the detector of the present invention, the ion source acceleration voltage may be considerably less than that required for other high mass ion detection systems.

Figure 5:
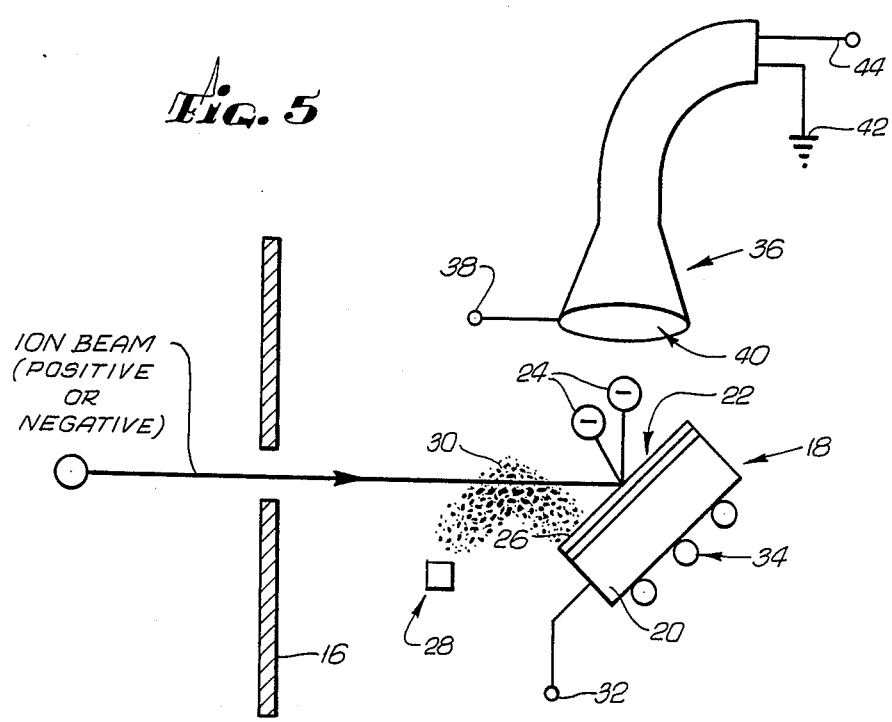
FIG. 5 is a schematic drawing of the ion detection system of the present invention.

Before arriving at the high mass ion detection system, illustrated in FIG. 5, the ion beam passes through a mass analyzer 12, shown in FIG. 4, which separates the ions based on their charge to mass ratios. Such mass analyzer 12 may be of the quadrupole type, magnetic sector type, or time of flight (TOF) type. Both the quadrupole and magnetic sector mass analyzer systems have inherent limitations, however, due to the requirements of increased mass analyzer size for increased ion mass. Accordingly, a TOF mass analyzer is preferred for very high mass biomolecule spectrometry. Such a suitable TOF mass analyzer is described in Erich W. Blauth, *Dynamic Mass Spectrometers,* Elsevier (1965), p. 71. Quadrupole and magnetic sector analyzers may also be employed, however, and are described at p. 140 and p. 1 of Blauth, respectively. After leaving the mass analyzer 12 the ion beam arrives at the detector 14. In, for example, a TOF system, the timing of the signal from the detector 14 will serve to indicate the mass of the ions.

Referring to FIG. 5, a preferred embodiment of the ion detection system 14 of FIG. 4 is shown. The incident biomolecular ion beam provided from the ion source 10 and mass analyzer 12 first passes through a detector shield 16 shown in FIG. 5. The detector shield serves to collimate the ion beam and to shield portions of the detector from the beam. Various detector configurations may require modification of the position and shape of the detector shield 16.

After passing through the detector shield 16, the biomolecular ion beam impacts on the target 18. The target 18 comprises a target substrate 20 with a planar first major surface 22 configured so as to intercept the ion beam.

Convertor targets may employ Ti, W, Cu, Al, Au and stainless steel. Mo provides a higher yield of negative ion production, however. Therefore, preferably, either Mo (or W) are employed as target materials.

Upon impacting the target surface 22, the incident biomolecular ions will fragment, i.e. dissociate into various size constituent. The extent of fragmentation will depend largely upon the incident ion velocity, however, significant fragmentation will occur for even relatively low impact velocity. Due to the characteristics of the atomic and molecular constituents of the incident biomolecules, in combination with the characteristics of the target surface, both of which are described in more detail below, the biomolecular fragments will have a tendency to become negatively ionized irrespective of the charge on the incident ion beam. Such negatively charged ions may be backscattered upon collision or may be later desorbed from the target surface 22 by subsequent collisions. Also, the impact of the ions will cause electrons to be given off from the target surface 22. Such backscattered and desorbed ions and electrons are collectively illustrated in FIG. 5 as negative charges 24 being emitted from target surface 22.

The target surface 22 is coated with a partial monolayer of cesium 26. Alternatively, BaO or other low work function material may be employed. As described in more detail below, the low work function properties of the cesium, or other low work function material coated on the target surface enhances the production of negative ions. The cesium monolayer may be provided by a cesium dispenser 28. The cesium dispenser 28 may take the form of a reservoir of cesium, or cesium compound, positioned adjacent the target surface 22 but out of the incident ion beam. The reservoir of cesium is periodically heated to vaporize the cesium 30 to thereby provide the desired monolayer of cesium on the target surface. Suitable cesium dispensers are manufactured by SAES GETTERS/USA, INC., for example their Model NF Series.

The target substrate 20 is coupled to a target biasing potential 32. The target biasing potential will be positive or negative depending upon the charge of the incident ions. A potential of $-2.5$ kV would be suitable for incident positive ions and a potential of $+2.0$ kV would be suitable for incident negative ions.

The target 18 is preferably provided with a heater 34 for heating the target 18 to a predetermined temperature. As described in more detail below, such heating increases the efficiency of electron emission from the target in response to the collision of the incident ions. The optimum temperature for detector efficiency is interrelated with the work function of the target surface and the electron affinity of the impacting ions. In an embodiment with a cesiated target surface 22, or other low work function surface having a work function of approximately 3 eV or less, and an incident beam of biomolecules, a suitable temperature range for the target 18 is 0°–400° C. This range assumes a background electron emission level of $10^{-15}$ A which would correspond to an acceptable signal to noise level.

The secondary negative ions and electrons 24 emitted from target surface 22 are detected by detector 36, which may be a CEM (Channeltron Electron Multiplier) detector. The CEM detector 36 may be of a type manufactured by Galileo Electro Optics Corp. such as their model 4000 Series. The CEM detector 36 is preferably positioned in a manner such that it is shielded from the incident ion beam by shield 16 and is only a few centimeters from target 18.

Figure 1:
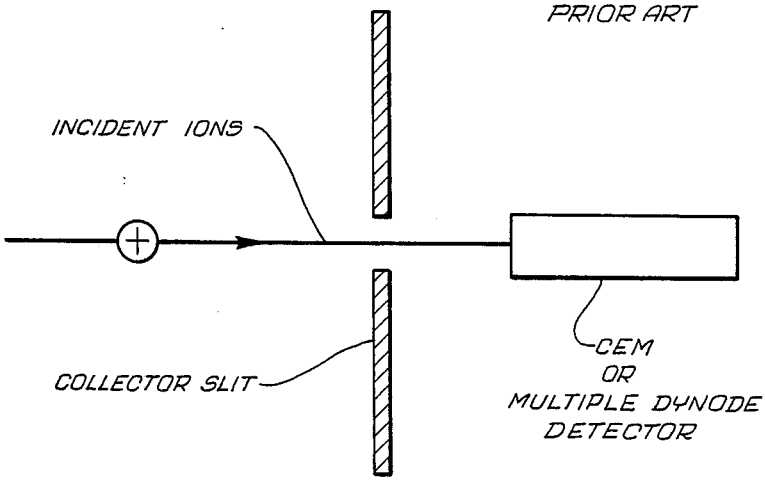
FIG. 1 is a schematic drawing of a prior art ion detection system used in mass spectrometry.
Figure 2:
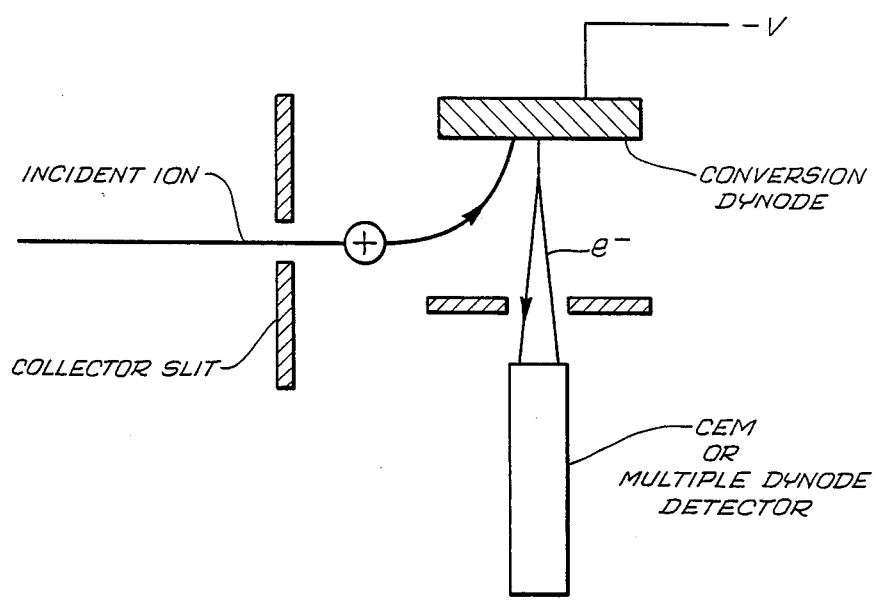
FIG. 2 is a schematic drawing of a prior art post acceleration ion detection system.
Figure 3:
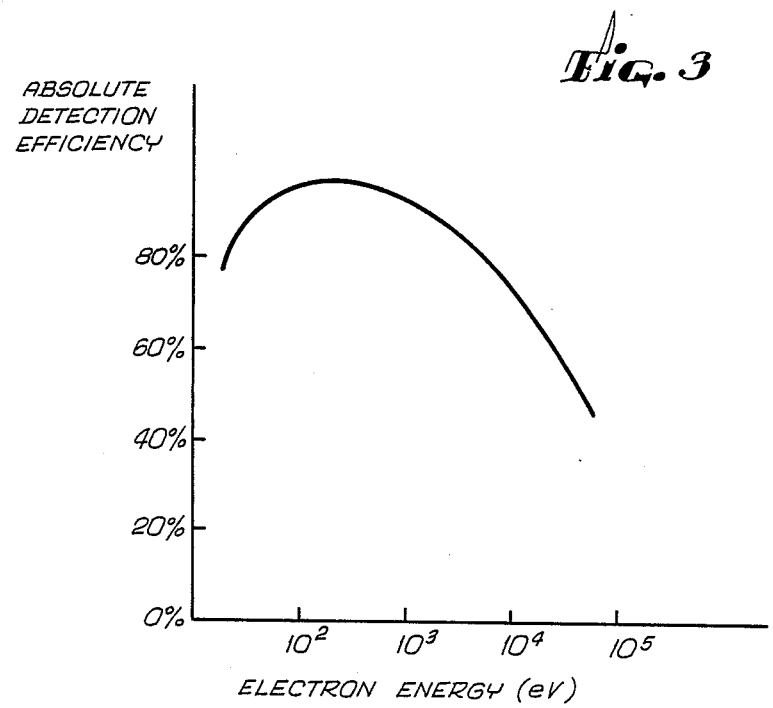
FIG. 3 is a graph illustrating the dependence of detection efficiency of a detector, such as shown in FIG. 1 or 2, upon electron energy.

The CEM detector operates in a conventional manner, i.e., ions and electrons impacting on a target at the anode end 40 of the detector 36 trigger an avalanche of secondary electrons which is multiplied through repeated collisions within the detector 36. The detector anode biasing potential 38 is chosen to provide a potential difference between the anode end 40 of the detector 36 and the target 18 sufficient to accelerate the low mass negative fragment ions 24 to velocities above the threshold for detection and electrons to an energy corresponding to their maximum detection efficiency. Such energy should thus correspond generally to the peak shown in FIG. 3, i.e., approximately 500 eV. Therefore, for a $-2.5$ kV target potential (suitable for positive incident ions), the detector biasing potential 38 may be chosen to be approximately $-2.0$ kV. The cathode end of CEM detector 36 will preferably be coupled to ground 42. A detection signal will be provided along line 44 in a conventional manner.

For negative incident ions, the target 18 should be maintained at a positive bias potential 32, for example, $+2.0$ kV. The anode end 40 of detector 36 should then be biased more positive, for example, by an anode biasing potential 38 of $+2.5$ kV. Cathode potential 42 should then be approximately $+4.5$ kV. Unlike conventional post-acceleration ion detectors, for either positive or negative incident ions, however, efficient production of secondary ions will be provided. Also, there is no problem in accelerating the secondary ions and electrons to velocities exceeding the threshold required to eject secondary electrons upon impact with CEM detector 36, due to the very low mass of the secondary fragment ions and electrons.

Figure 6:
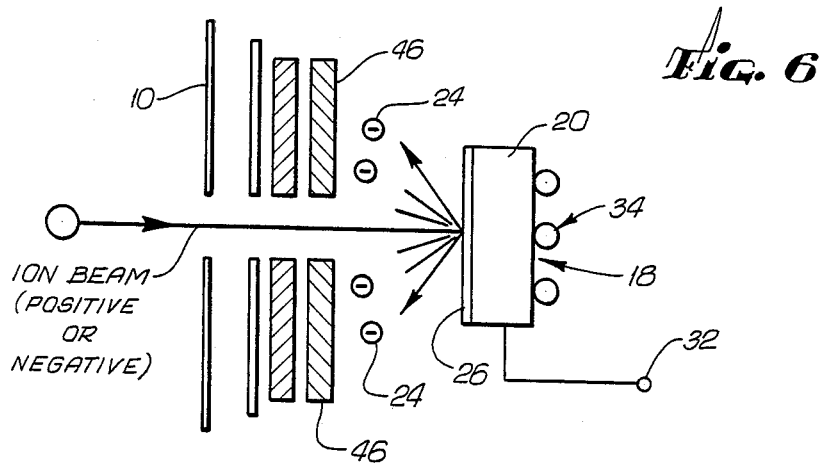
FIG. 6 is a schematic drawing of an alternate configuration of the ion detection system of the present invention.

Referring to FIG. 6, an alternate embodiment of the ion detection system is shown. The detection system of FIG. 6 differs from that of FIG. 5 in that target 18 is positioned perpendicular to the direction of the ion beam rather than at an angle as shown in FIG. 5. Also, an annular, on-axis CEMA (Channeltron Electron Multiplier Array) detector 46 is employed in place of the off-axis detector 36 of FIG. 5. The CEMA detector 46 may be of the type manufactured by Galileo Electro Optics Corp., such as their model LPD-25. The configuration of FIG. 6 may be advantageously employed in applications where space limitations are present.

As mentioned above, in contrast to conventional ion detectors, the high mass ion detection system of the present invention exploits the physio-chemical properties inherent in the structure of large biomolecules as well as the electronic material properties of the target surface 22. The negative ion production efficiency is a function of the difference between the work function ($\phi$) of the impacted surface and the electron affinity ($E_a$) of the fragmented species: ($\phi - E_a$). For optimum efficiency, a low work function surface must be combined with an atom or molecule with high electron affinity. Target heating may also enhance negative ion and electron production efficiency.

The significance of target surface work function and temperature and incident ion electron affinity on negative ion conversion efficiency relates to the physical processes underlying negative ion formation on the target surface 22. Negative ions can be generated from ion beams incident on target surface 22 through one or more surface conversion processes. The conversion processes most significant in detecting high mass ions are the following:

(1) Desorption of negative ions (e.g. $H^-$, $OH^-$, $O^-$, $O_2^-$), present as background impurities or residual fragments from prior biomolecule deposition, from the surface by energetic ion impact.

(2) Backscattering or reflection of secondary particles from the surface in the form of negative ions after dissociation or fragmentation of biomolecular ions.

(3) Electron production by thermionic emission from the target surface.

The relationship between work function, temperature, electron affinity and negative ion production efficiency can be illustrated more specifically by using an incident hydrogen ion beam as an example. From the well known Saha-Langmuir relationship, the ratio (R) of the negative ion flux leaving a surface to the total impingement rate of H+ ions can be estimated by:

$$R = [1 + (g_o/g_-)\exp[(\phi - E_a)/kT]]^{-1}$$

where ($g_o/g_-$) is the ratio of the statistical weight of the atomic and ionic states, k is the Boltzmann constant and T is a temperature term. The temperature term T is interpreted as an effective temperature which exists around the incident particle for a short time due to conversion of some fraction of the impact energy into heat. An analogous relationship between target surface work function and effective temperature exists for thermionic emission of electrons and is described by the well known Richardson equation.

By combining a surface of low work function with an incident ion species having a high electron affinity, the value of the ($\phi - E_a$) energy term in the exponent is minimized and the negative ion production efficiency is enhanced. Additionally, increasing the temperature term T by heating the target will enhance efficiency. Such heating is limited, however, by a temperature at which thermionic electron emission will be continuous thereby giving undesired background noise.

The present invention exploits the high electron affinity characteristics of the primary biomolecule constituents to enhance negative ion production efficiency. Large, biomolecules consist mostly of elements that possess high electron affinities, for example, hydrogen (0.77 eV), carbon (1.25 eV) and oxygen (1.46 eV). Additionally, organic fragments of low molecular weight commonly formed by collisions (such as OH, $C_2$, $CH_2$, $C_2H_2$, CO, CHO, COOH and others) also possess high electron affinities.

Table I lists the formulas and nominal masses of some peptides under mass 10,000 amu.

TABLE I

| Peptide | Peptide Molecules | |
|---|---|---|
| | Nominal Mass | Formula |
| Leu-Enkephalin | 556 | $C_{28}H_{38}N_5O_7$ |
| Angiotensin II | 1046 | $C_{50}H_{72}N_{13}O_{12}$ |
| Fibrinopeptide A | 1520 | $C_{64}H_{102}N_{19}O_{24}$ |
| B-Lipotropin | 2175 | $C_{98}H_{139}N_{26}O_{29}S_1$ |
| Glucagon | 3480 | $C_{153}H_{226}N_{43}O_{49}S_1$ |
| Bovine Insulin | 5727 | $C_{254}H_{377}N_{65}O_{75}S_6$ |
| Human Proinsulin | 9378 | $C_{410}H_{638}N_{114}O_{127}S_6$ |

Over 90% of the total atoms in each molecule listed consists of the atomic constituents C, H, and O. This percentage is likely to persist for larger molecules up to and exceeding 100,000 amu. Due to the large number of atoms with high electron affinities in an incident, energetic beam of biomolecular ions, a high percentage of the resulting fragments will have a high electron affinity for virtually any class of biomolecular ions.

For maximum conversion efficiency a target surface work function of about 1.45 eV is preferred. This corresponds to an optimum cesium coverage of half a monolayer. To achieve such a half monolayer of cesium on the target surface, consecutive or continuous cesium depositions may be made by alternately heating and cooling a dispenser containing a cesium compound which releases free cesium upon heating.

Figure 7:
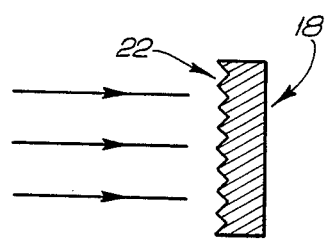
FIG. 7 is a cross-sectional drawing of a preferred target employed in the ion detection system of the present invention.

The negative ion conversion efficiency is also dependent on the ion beam angle of incidence with respect to the target normal. For low mass incident ions, such as H+, this dependence is most pronounced. Negative ion yields from a planar target may be improved using a serrated or saw-toothed target surface 22 as shown in FIG. 7. Notching the surface of the target provides a high angle of incidence while retaining the flexibility for off or on-axis detector positioning as shown in FIGS. 5 and 6.

For conventional impact schemes, the yield of negative ions formed can be lower than that for positive fragment ions. This limitation is not present in the detection system of the present invention where high mass biomolecular ions are impacted on a low work function surface. Accordingly, high sensitivity ion detection is provided for positive or negative incident ions.

The survival probability of negative ions once formed is further enhanced by the following features: a relatively small separation between the target surface 22 and CEM detector 36; absence of intermediate surfaces where collisions could result in the destruction of the negative ions formed at the target surface; and low background particle densities.

While the present invention has been described in terms of the presently preferred embodiment, it will be appreciated that the present invention is equally applicable to a wide variety of alternate embodiments. For example, while the ion detection system of the present invention has been described in a preferred application in an improved mass spectrometry system employing a source of ionized biomolecules, or other ion source providing ions with high electron affinity constituents, it should be appreciated that significant improvements may also be achieved in mass spectrometry applications involving other types of ions, and in various applications involving detection of a wide range of ion types and masses outside of the mass spectrometry field. Additionally, while the preferred embodiment has been described in terms of a specific configuration of detector, target and electron multiplier in relation to the ion beam and with respect to each other, many different configurations are possible. Similarly, while specific preferred voltage values have been described for the target bias potential and the electron multiplier detector bias potential, considerable variation in these values is possible while still remaining within the scope of the present invention. Specifically, the optimum potential difference between the target and electron multiplier detector will vary with the specific electron multiplier detector employed and with the specific biomolecules analyzed. Similarly, the temperature to which the target is heated may be varied through a considerable range while giving substantial enhancement to the detector efficiency. Additionally, with respect to the manner in which a low work function target surface is created, whether by forming a monolayer of low work function material, such as cesium or barium oxide, or by forming a low work function alloy or composite film (such as oxygenated cesium), many modifications are possible while remaining within the scope of the present invention.

It will be apparent to those skilled in the art that other changes in the details of the preferred embodiment described may be made and such alternate embodiments are within the scope of the present invention.

What is claimed is:

1. An ion detection system, comprising:
   means for providing a beam of high mass organic ions having substantial percentages of carbon, hydrogen and oxygen atoms;
   target means for intercepting said molecular ions, dissociating said molecular ions into fragments having high electron affinities, and ejecting secondary negatively charged fragment ions and electrons, comprising:
      a target substrate having a first major surface oriented so as to intercept said ion beam, said target substrate having a temperature not greater than 400° C;
      means, coupled to said target substrate, for maintaining said target substrate at a first bias potential; and
      means, coupled to said target substrate, for providing a low work function material having work function of less than 2.2 eV to said target substrate such that the first major surface of said target substrate is substantially coated with a layer of said low work function material; and
   detection means, configured with respect to said target so as to receive the secondary negatively charged fragment ions and electrons ejected from said target means, for detecting said secondary negatively charged fragment ions and electrons and for providing an electrical signal corresponding to said detected secondary particles.

2. An ion detection system as set out in claim 1, wherein said target substrate is comprised of Mo or W.

3. An ion detection system as set out in claim 1, wherein said target substrate has a second major surface and a porous structure extending from said second major surface through said substrate to said first major surface, and
   wherein said means for providing a low work function material comprises, a reservoir of liquid cesium and means for transferring cesium from said cesium reservoir to said second major surface.

4. An ion detection system as set out in claim 1, wherein said means for providing cesium comprises a source of cesium vapor disposed adjacent said first major surface of said target substrate.

5. An ion detection system as set out in claim 1, wherein the first major surface of said target substrate has a saw-toothed cross-sectional shape.

6. An ion detection system as set out in claim 1, wherein said means for providing a beam of ions comprises a source of biomolecular ions.

7. An ion detection system as set out in claim 1, wherein said detection means has an anode portion maintained at a second bias potential approximately 500 volts more positive than said first bias potential.

8. An ion detection system as set out in claim 1, further comprising means for heating said target to a predetermined temperature.

9. An ion detection system as set out in claim 8, wherein said predetermined temperature is within the range 0°–400° C.

10. An improved mass spectrometry system, comprising:
    means for providing a beam of high mass, ionized biomolecules;
    means for analyzing the beam of ionized biomolecules according to the mass-to-charge ratio of the ionized biomolecules and providing an output mass analyzed beam of biomolecular ions; and
    detector means for detecting said mass analyzed beam of biomolecules, comprising:
       means for shielding a portion of said detector means from said incident ion beam and for collimating said ion beam;
       a target positioned so as to intercept said incident beam of biomolecular ions, said target comprising a target substrate and a target surface, said target substrate having a temperature not greater than 400° C.;
       a layer of low work function material on said target surface wherein said low work function material is selected from the group consisting of Cs, $Cs_2O$ and $Cs_2O_2$;
       means for biasing said target to a predetermined target bias potential; and
       means for detecting secondary ions and electrons emitted from said target surface.

11. A mass spectrometry system as set out in claim 10 wherein said target substrate is composed of molybdenum.

12. A mass spectrometry system as set out in claim 10 wherein said means for detecting comprises an electron multiplier detector having an anode and cathode, and wherein said anode has a first detector potential applied thereto and said cathode has a second detector potential applied thereto which is more positive than said first detector potential.

13. A mass spectrometry system as set out in claim 12 wherein said predetermined target bias potential is more negative than said first detector potential applied to said anode by a potential difference corresponding to an energy provided to said secondary ions and electrons upon acceleration through said potential difference which provides maximum detection efficiency by said electron multiplier detector.

14. A mass spectrometry system as set out in claim 10 wherein said means for providing a low work function material comprises a dispenser containing said low work function material coupled to a current source so as to selectively conduct current therethrough, thereby heating and vaporizing said low work function material.

15. A mass spectrometry system as set out in claim 13, wherein said target bias potential is approximately −2.5 kV, said first detector potential is approximately −2.0 kV, and said second detector potential is ground.

16. A mass spectrometry system as set out in claim 13, wherein said target bias potential is approximately +2.0 kV, said first detector potential is approximately +2.5 kv, and said second detector potential is approximately +4.5 kV.

17. A method for detecting positive or negative incident biomolecular ions, comprising the steps:
accelerating said positive or negative incident ions of high mass toward a target, by means of a first bias potential applied to said target, said target having a target surface and a temperature not greater than 400° C.;
providing a layer of oxygenated cesium on said target surface;
impacting said accelerated ions on said low work function target surface thereby causing secondary ions and electrons to be emitted from said target surface;
accelerating said secondary ions and electrons away from said target surface toward a detector having an anode maintained at a second bias potential, said first and second bias potentials cooperatively accelerating said secondary ions above the threshold velocity of said detector;
impacting said secondary ions and electrons on said detector anode thereby generating additional secondary electrons; and
detecting said additional secondary electrons and providing a detection signal corresponding thereto.

18. An ion detection system as set out in claim 1, wherein said high mass organic ions have a mass of 1000 amu or greater.

19. An improved mass spectrometry system as set out in claim 10, wherein said high mass ionized biomolecules have a mass of 1000 amu or greater.

20. A method as set out in claim 17, wherein said biomolecular ions have a mass of 1000 amu or greater.

* * * * *